(12) United States Patent
Chien (10) Patent No.: US 7,810,985 B2
(45) Date of Patent: Oct. 12, 2010

(54) MULTIPLE FUNCTION NIGHT LIGHT (76) Inventor: Taeng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 0 days.

(21) Appl. No.: 11/094,155

(22) Filed: Mar. 31, 2005

(65) Prior Publication Data
US 2006/0072346 A1 Apr. 6, 2006

Related U.S. Application Data (63) Continuation of application No. 10/954,189, filed on Oct. 1, 2004.

(51) Int. Cl.
H01R 33/009 (2006.01)
H01R 39/00 (2006.01)

(52) U.S. Cl. .............. 362/641; 362/642; 362/643; 439/6; 439/8; 439/11; 439/31; 439/131

(58) Field of Classification Search .......... 362/641, 362/642, 643; 439/6, 8, 11, 31, 639, 640, 439/131, 172
See application file for complete search history.

(56) References Cited

U.S. PATENT DOCUMENTS

| 3,061,716 A * | 10/1962 | Benander ............ 362/641 |
| 4,298,241 A * | 11/1981 | Bernstein ............ 439/620.08 |
| 5,004,435 A * | 4/1991 | Jammet ............ 439/652 |
| 5,859,523 A * | 1/1999 | Nierescher et al. ......... 320/111 |
| 6,171,117 B1 * | 1/2001 | Chien ............ 439/86 |
| 6,302,559 B1 * | 10/2001 | Warren ............ 362/643 |
| 6,499,853 B2 * | 12/2002 | Stekelenburg ............ 362/84 |
| 6,786,743 B2 * | 9/2004 | Huang ............ 439/131 |
| 2002/0075677 A1 * | 6/2002 | Dokoupil ............ 362/226 |
| 2003/0199183 A1 * | 10/2003 | Wangenheim et al. ...... 439/100 |
| 2005/0112908 A1 * | 5/2005 | Yueh ............ 439/8 |

* cited by examiner

Primary Examiner—Jong-Suk (James) Lee
Assistant Examiner—Mark Tsidulko
(74) Attorney, Agent, or Firm—Bacon & Thomas, PLLC (57) ABSTRACT A multiple function night light includes at least one night light receptacle and a swivel or rotating prong as a basic unit which may further incorporate additional functions as desired to prevent the electric wall outlet receptacle from being occupied by just one single function night light. The night light includes a light source such as a gas filled light, neon or black tube, fluorescent tube, LED, OLED, EL, or OEL with appropriate circuit means to provide a predetermined light performance, duration, and timing for illumination. The swiveling or rotating prong offers universal installation to wall outlets. The additional functions may selected from fragrance, bluetooth device, insect repellant device, sensor device, infrared device, remote control device, power failure light, emergency light, or other electric device(s).

9 Claims, 11 Drawing Sheets

MULTIPLE FUNCTION NIGHT LIGHT

This application is continuation of U.S. patent application Ser. No. 10/954,189, filed Oct. 1, 2004.

BACKGROUND

The inventor's prior U.S. Pat. Nos. 5,926,440, 6,158,868, 6,170,958, 6,171,117, 6,280,053 disclose arrangements for the conductive means of a night light and multiple function night light incorporated with a time piece. Other prior U.S. Pat. Nos. 4,947,291, 5,495,402, 5,662,408, 5,713,655, 5,803,579, 5,816,682, 5,833,350, 5,893,626, 5,998,928, 6,000,807, 6,010,228, 6,031,958, 6,033,087, 6,056,420, 6,132,072, 6,160,948, 6,161,910, 6,183,101, 6,190,017, 6,290,368, 6,337,946, 6,386,730, 6,390,647, 6,00,104, 6,411,524, 6,431,719, 6,509,832, 6,523,976, 6,550,949, 6,609,812, 6,623,416, 6,641,289, 6,648,496, 6,709,126 show different light sources and applications, but none teaches a night light incorporated with a receptacle(s) means. These patents also do not teach a swivel, rotating, or twisted prong means of such a night light. The multiple function night light of the current invention includes a receptacle(s) and built-in night light to offer at least two of the functions as a basic model. The up-grade model can have additional functions which may selected from an air freshener, insect repelling device, time piece, remote control device, emergency light, bluetooth device, infrared device, sensor device, deodorizing device, and combination light source(s) etc. U.S. Pat. No. 6,862,403 issued on Mar. 1, 2005, discloses a plug assembly rotatable over 90 degrees, but in which only the three sides of the outer housing have an opening(s) to receive the other device's plug. The current invention has an opening(s) on each of four sides of the outer housing to receive the other device's plug, and furthermore provides space at top and lower portions of the conductive means to install a desired light means such as an LED, gas filled bulb, neon bulb, OEL, EL, OLED, or other conventional light means to enable the unit to emit light to a viewer in preferred directions ranging from one to multiple directions. The current invention also may include a housing with partial transparent or translucent material to provide a desired area with light emissions to the viewer. The current invention's rotating unit has the light means built-in, conductive means between the light means and the prong means, prong means, and circuit means (if needed for some light source), and each receptacle may be oriented in an opposite direction which allows other devices' prong means to be connected in 180 degree openings at the top and bottom or right and left relative to the wall outlet position.

The multiple function night light includes a light source(s) and receptacle(s) built together inside of night light. The current invention includes the receptacle(s) to prevent the wall outlet receptacle(s) from being occupied by a single night light and cause people to have to use other receptacle means such as an extension cord or multiple receptacle(s) set to connect other electric devices with home electricity. The current invention provides at least one receptacle inside the night light to provide two functions, one for night time illumination and one for the receptacle(s) to connect with other electric devices.

The current invention preferably includes more than one receptacle(s) built inside of the said night light. The number of receptacle(s) can be designed to be anywhere from 1 to N (N means any number from 1 to 2, 3, 4, 5, ... ). The number of the receptacles can be made by proper design of the copper means to meet the same or similar safety standard as a conventional market place available model.

The current invention further incorporates swivel or rotating prong means to allow people to make a preferred installation for the illumination and electric connection.

The light source may selected from the group including an EL Element, LED, gas filled bulb, black tube, fluorescent tube, or neon bulb with related circuit means to provide proper illumination with desired orientation and direction.

The night light may be a slim model or a standard model. The slim model preferably uses an EL element as a light source since the slim model only has less than 3 mm space to install the light source. The standard model can use any conventional light source since the space available is enough to install an LED, gas filled bulb, black tube, fluorescent tube, neon bulb, OEL, or conventional light source.

DETAILED DESCRIPTION OF THE PREFERRED EMBODIMENTS

Figure 1:
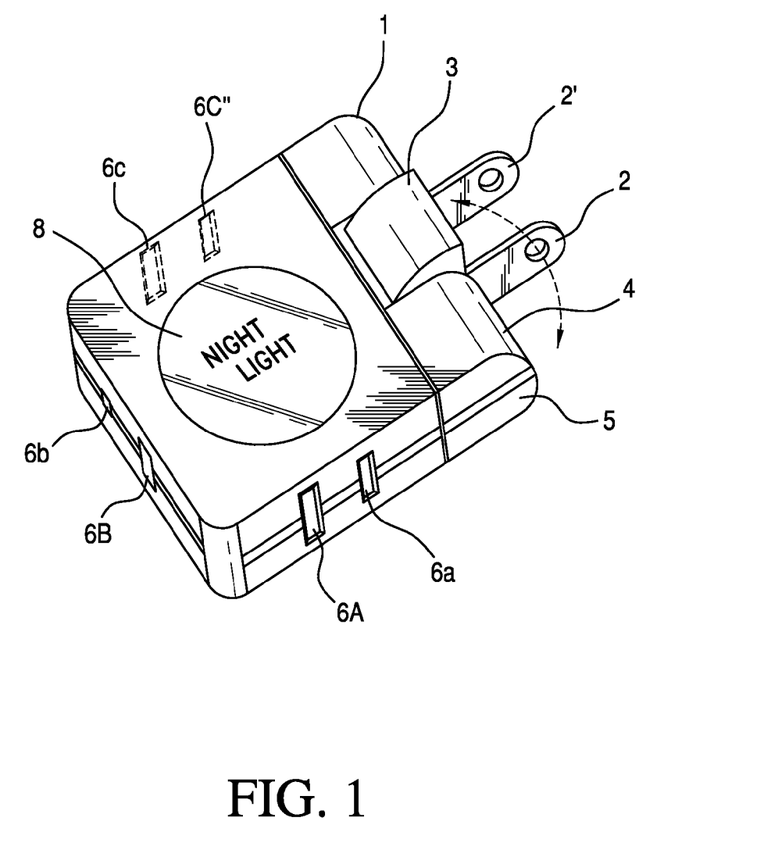
FIG. 1 shows the slim model of a multiple function night light according to a first preferred embodiment of the invention.

FIG. 1 shows a multiple function night light (1) which has three receptacles (6A)+(6a), (6B)+(6b), (6C+6c") for prong means (not shown) to be inserted into in order to supply electricity via the night light prong (2)+(2') from the wall outlet. The swivel holder (3) can be swiveled from the center to an upper 90 degree and lower 90 degree, for a total of approximately 180 degrees. At least one light means (8) is securely installed on a desired surface to get the desired illumination from the preferred light source, which may selected from an LED, gas filled bulb, fluorescent tube, black tube, EL, OEL or other light means available from the marketplace and which can offer illumination.

Figure 2:
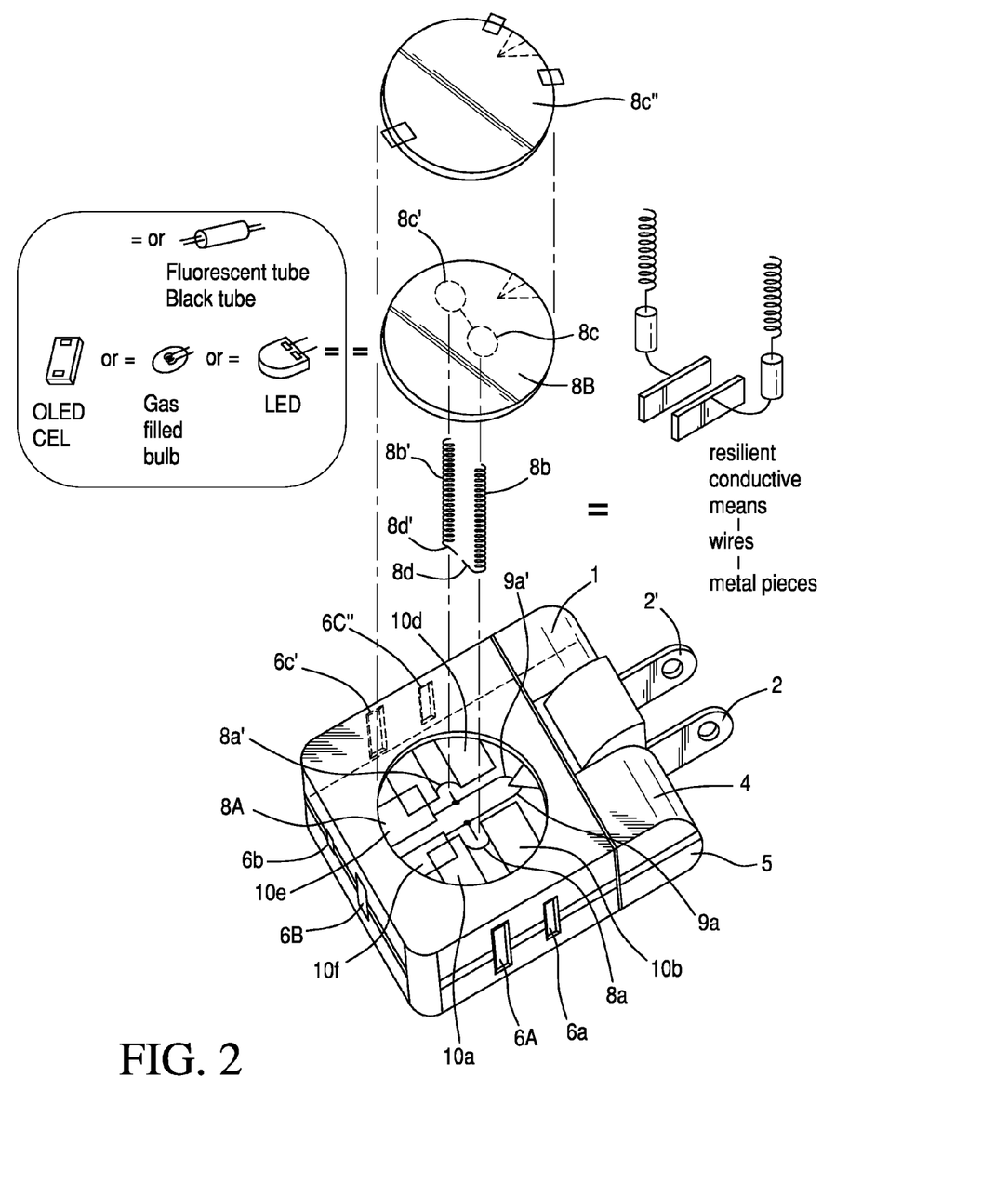
FIG. 2 shows the slim model of the preferred embodiment with an EL means as the light source.

FIG. 2 shows a multiple function night light having three receptacles (6A+6a), (6B+6b), (6C"+6c) made by inner copper means (9a) and (9a') which are connected with at least one conductive means such as a wire(s), metal piece(s) or conductive rubber, or a desired combination of conventional market available material in a desired configuration and assembled by a conventional process such as soldering, hot spotting, clipping, snapping, riveting, twisting or another equivalent method or process to enable electricity to be supplied from the copper means (9a) and (9a') to the light source's electrodes (8c) and (8c'). The conductive holders (8a) and (8a') hold conductive means in the form of springs (8b) (8b') which have one end with a straight extension (8d) (8d') that can be soldered to the copper means (9a) (9a') to enable electricity delivery from the copper means to the other end of the spring. The other end of conductive means (8b) (8b') will contact the light mean's electrodes (8c) (8c') to delivery electricity from the spring to the light means. The conductive means (8b) (8h') connected with copper means (9a) (9a') may incorporate any kind of conductive means such as wire(s), conductive rubber(s), metal piece(s), or any conductive material(s) combination to enable electricity delivery from the night light prong means (2) (2') to the light source(s) electrodes. The current invention preferably uses conductive means in the form of spring because it can be soldered and have resilient properties to overcome gaps and make safe electric connection, as described in the inventor's U.S. Pat. No. 6,171,117. U.S. Pat. No. 6,280,053. U.S. Pat. No. 6,170, 958. and U.S. Pat. No. 6,183,101 except that the present construction has a broader scope in that the resilient conductive means may be incorporated with conventional conductive means to build the electric path from the night light prong means to the light means. This results in a big improvement in versatility for a multiple function night light.

FIG. 2 shows light means (8B) that are preferably EL elements because they are so thin and can be installed within a space of less than 3 mm. A cover (8C") covers the EL element (8B) and provides safety sealing for the light means (8B), conductive means (8b) (8b') and conductive holder (8a) (8a') within the copper means (9a) (9a') which are arranged between the isolation walls.

The isolation or insulating walls (10a) (10b) (10c) (10d) (10e) (10f) are designed to ensure that the copper means (9a) (9a') do not have any risk of electric hazard or short circuits.

Figure 3:
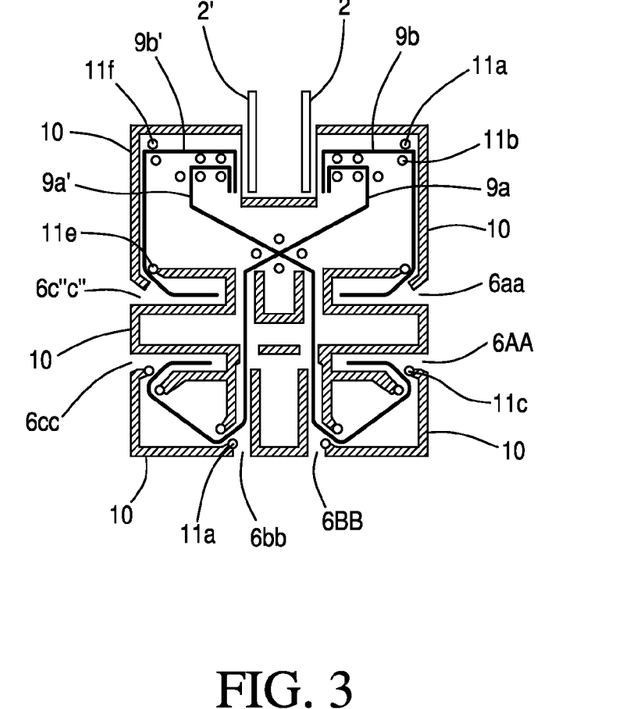
FIG. 3 and FIG. 4 show the construction of the preferred slim model embodiment including copper means and isolating walls designs.

FIG. 3 includes shadow areas (10) that indicate the preferred isolation walls which make up the upper case (4) and lower case (5) of the night light (1). The plurality of isolation walls (10) provide the proper isolating channels to allow copper means (9b) (9b') (9a) (9a') to be easily and safely installed in the cases. The extra posts (11a) (11b) (11c) (11d) (11e) (11f) (11g) . . . offer a proper bending position so the copper means (9a) (9a') (9b) (9b') can be fixed precisely at desired positions without any deviation during installation.

Figure 4:
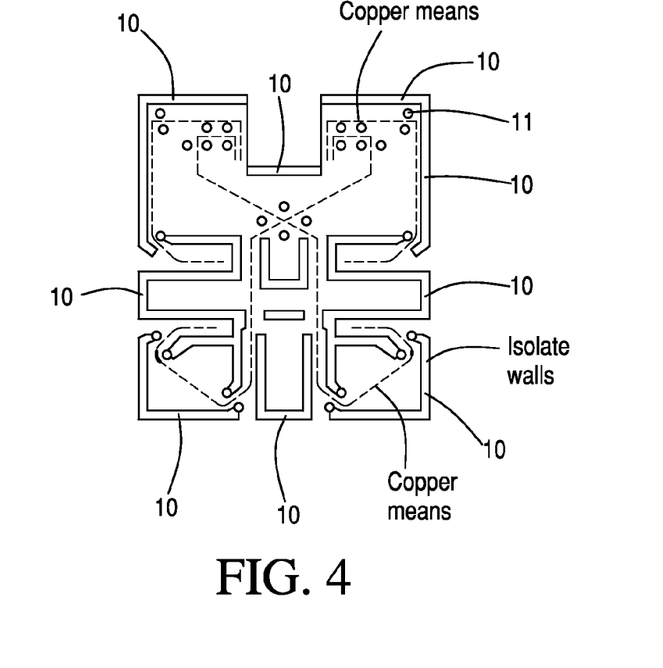

FIG. 4 shows another diagram for the isolation walls (10), isolation post (11) and copper means (dotted lines) inside the upper case (4) and lower case (5).

Figure 5:
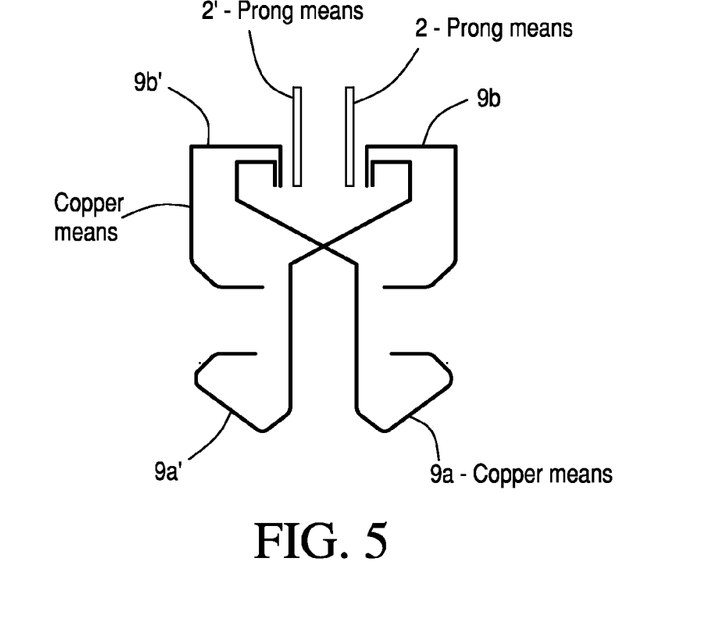
FIG. 5 is a detailed drawing of copper means for the embodiment of FIG. 3 and FIG. 4.

FIG. 5 shows the configuration of the copper means (9a) (9a') (9b) (9b') to form three receptacle(s) of the first preferred embodiment with the night light's prong means (2) (2') at a corresponding position inside the cases (4) and (5).

Figure 6:
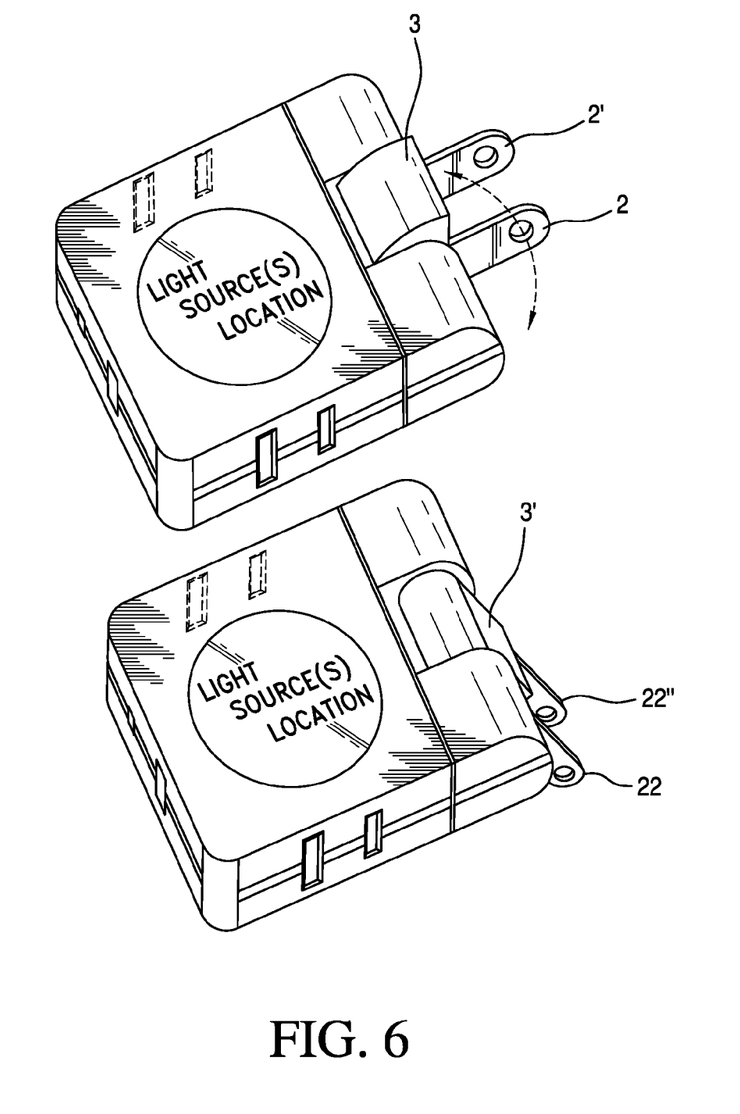
FIG. 6 shows one of the swivel prong means for the slim model of the of the preferred embodiment.

FIG. 6 shows the swivel prong means of the night light. The prong means can be rotated from the original position (2) (2') to the position (22) (22'). The swiveling, rotating, or twisting of the night light prong means allows people to make the proper electric connection with another device's prong means which may have a different size, such as big size of transformer, cellular phone charger, or computer three pole prong set. The swivelable prong means of the night light allows the night light to accommodate prong means in different sizes to provide people with a satisfactory arrangement. These are key features of an embodiment of the current inventions, although the invention is not limited to have to have these features.

Figure 7:
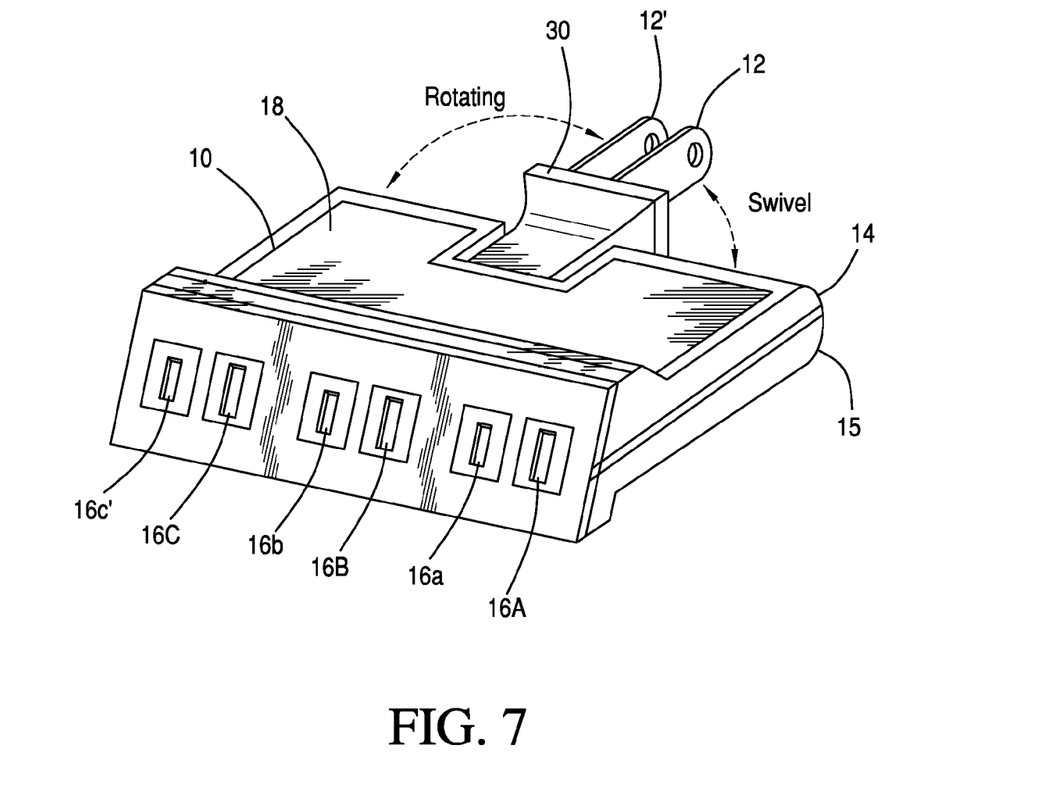
FIG. 7 shows a second preferred embodiment of a slim model of a multiple function night light.
Figure 8:
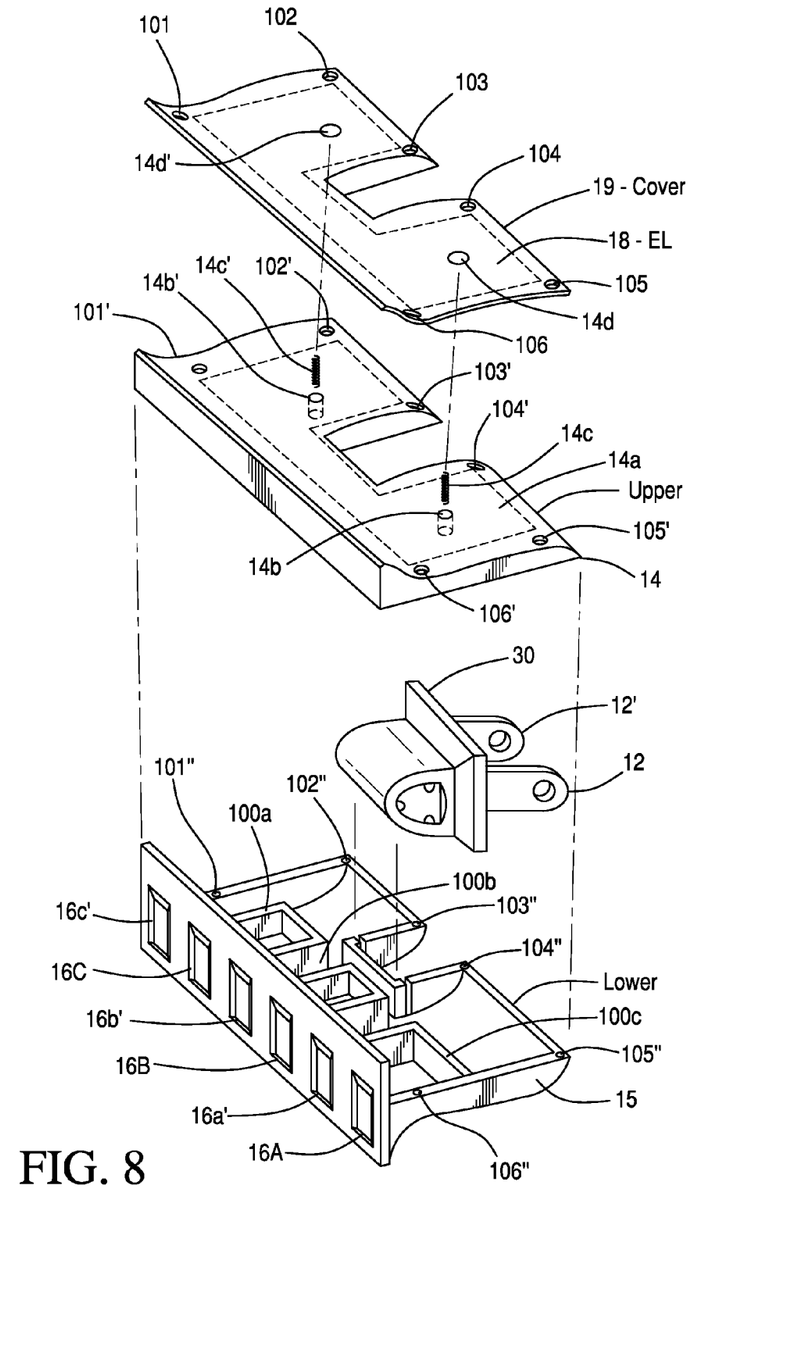
FIG. 8 shows the construction of the second preferred slim model embodiment.

FIGS. 7 and 8 show the second preferred embodiment of the invention, which has an upper case (14) and lower case (15) with a swivelable prong means (30) and two prong means (12) (12'). The lower case (15) has side-by-side receptacles means (16A+16a'), (16B+16b'), (16C+16c') with isolation walls (100a) (110b) (100c) to enable the copper means (not shown) to be safely and easily installed at a proper position. The upper case (14) has a groove area (14a) (14a') to allow EL light means installation. The two holes with posts (14b) (14b') extend into the lower case (15) to allow the inner conductive means to has a spring type form (14c) (14c') to ensure electrical contact with the copper means (not shown) and the EL panel's electrodes (14d) (14d') and cause the EL element (18) to offer illumination. The conductive means include resilient conductive means such as a spring or conductive rubber, or a combination of resilient conductive means, metal pieces, or wires connected by conventional riveting, spotting, snapping, or clipping of these wires, by a metal piece, or by resilient conductive means to provide the desired electric delivery from the prong means to the light sources. Further details of suitable conductive arrangements may be found in the Inventor's prior art patents cited above. Here, we emphasize the conductive material combination especially for EL element and OEL elements to supply electricity from the prong to the light source, even though the light source electrodes and prong location may not be on the same level of the said night light unit. The EL element (18) under a cover means (19) and fasten by fasten means such as variety of screws (not shown) though the holes (101) (102) (103) (104) (105) (106) and the holes of the upper case (101') (102') (103') (104') (105') (106') to fasten on the lower case (101") (102") (103") (104") (105") (106").

Figure 9:
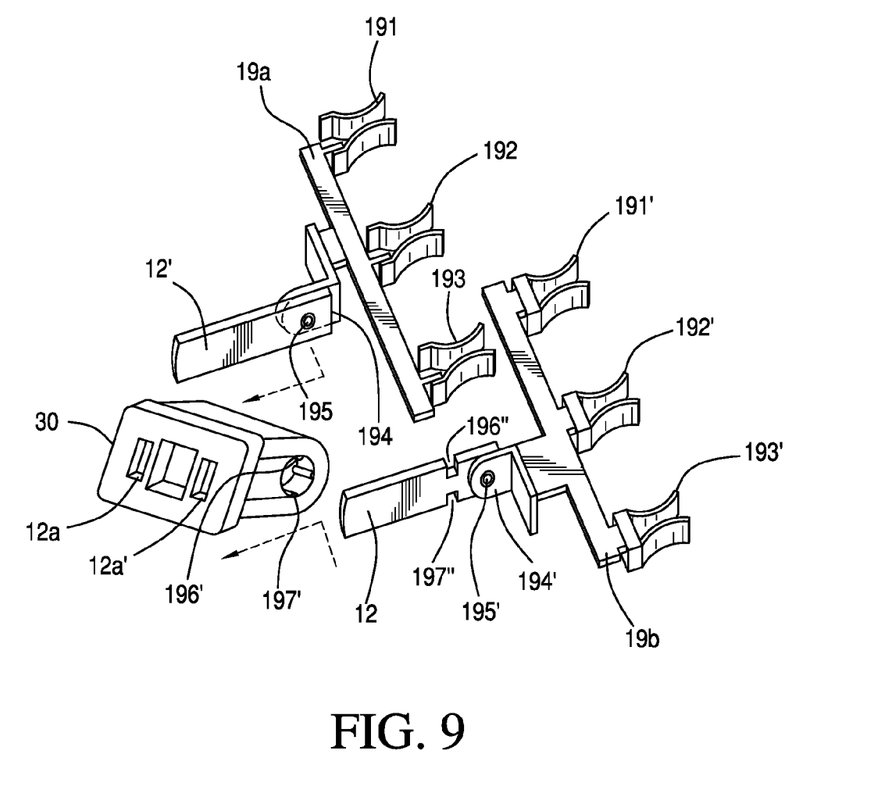
FIG. 9 shows copper means construction and a housing for the swivel prong means of the second preferred embodiment.

FIG. 9 shows that the swivel prong means (12') (12) connect with copper means (19a) (19b) individually. The prong means (12') connect with copper means (19a) by a riveting process to hold them together and let the prong means (12') swivel at least 180 degrees. The prong means (12) connect with copper means (19b) by the riveting process to hold together and let the prong means (12) swivel at least 180 degrees. An alternative and equivalent process also can be considered to replace the riveting process as long as the electricity can be delivered from the prong means to the copper means, and the prong means can swivel to a desired angle.

As shown in FIG. 9, the prong means (12) can be inserted into the hole (12a') and hold the prong means (12) by the small poles (196') and (197') which fit the opening (196") and (197'). The prong means (12) will properly fit within the prong holder (30). Similarly, the prong means (12') will be properly installed on hole (12a) and swivel to a desired angle. As shown in FIG. 9, the copper means (19a) have extension parts (191) (192) (193). These three extension parts are connected with prong means (12'). The copper means (19b) have extension parts (191') (192') (193'), which are connected with prong means (12). All the receptacles are installed on the case as elements (191) (191') (192) (192') (193) (193'), with isolation walls included for safety to separate the extension parts from each other and prevent electric shock and hazard. The extension parts (191) and (191') form a receptacle set. The extension parts (192) and (192') also form a receptacle set, as do the extension parts (193) and (193').

Figure 10:
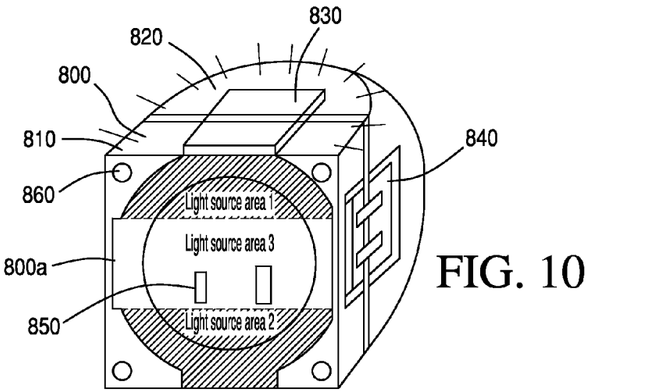
FIG. 10 shows a standard model of a multiple function night light according to a third preferred embodiment of the invention.
Figure 11:
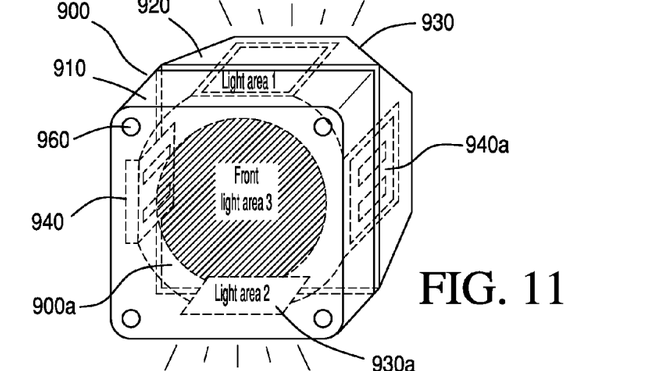
FIG. 11 shows receptacles and a light arrangement of the third preferred embodiment.

FIG. 10 shows the standard model of the multiple function night light (800) having a front case (810) and back case (820) with the receptacles (840) and (840'—not shown) on the opposite side surfaces. The illuminated areas may be located at surfaces (830) and (830'—not shown) which are on opposite sides. The illumination areas also can be located on the front surface of the unit such as area (800*a*). Hence, three surfaces or areas can have a night light arrangement in this preferred embodiment. FIG. 11 shows more details for two of the receptacles (940) and (940') on the opposite position of the two sides of the said night light (900). The two areas on the rim of the night light (930) and (930') can have light emitting out to viewer as required or desired. The front case (910) and back case (920) are assembled together by assembly means such as ultra-sonic sealing, glue, chemical solvent, liquid, hot melting, screws, riveting, snapping, press-tight, and inclusion of a catch and hook device to securely seal the front and back case.

Figure 12:
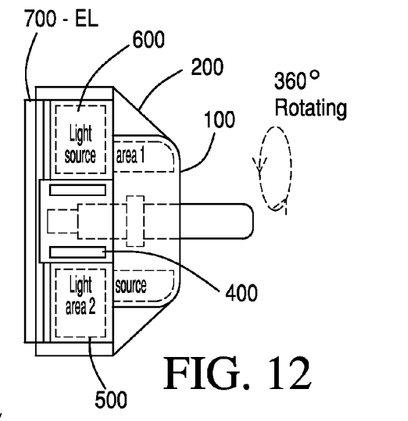
FIG. 12 is a side view of the third preferred embodiment's construction.

FIG. 12 shows a side view of the third preferred embodiment in the form of a standard model multiple function night light which is not the super slim type and has enough space to allow placement of an LED, gas filled bulb, fluorescent tube, black tube, OEL, or EL elements with related circuit means to cause light to be emitted to the viewer. These types of multiple function night light may have any combination of light means selected from the above discussed LED, gas filled bulb, fluorescent tube, black tube, OEL or OLED, or EL elements and related circuit means to cause the light means to provide illumination. As shown in FIG. 12, the case (100) has a two diameter tube-like body with a bigger diameter on the left and a smaller diameter on the right. The prong means (300) and its related copper means are located in the space (400) to supply electricity from the prong means (300) to receptacles by conductive means which may include any combination of a resilient conductive member and conductive metal piece, or wires to allow electricity to be delivered from the night light prong means to the receptacle means and light source.

The two spaces (500) and (600) of the two diameter tube (100) allow desired light means or any combination of light means to be installed with its circuit means within and allow the light to be emitted out to the viewer. The front surface of the night light can have an EL, OLED, or OEL light means installed to supply electricity from the night light prong means (300) to the light means end by conductive means and its combination of conductive member, wires, and resilient conductive means. The two diameter tube (100) is properly installed within the outside cylinder case (200) to allow the two diameter tube (100) to be rotated so as to fit any kind of wall outlet's receptacle orientation.

Figure 13:
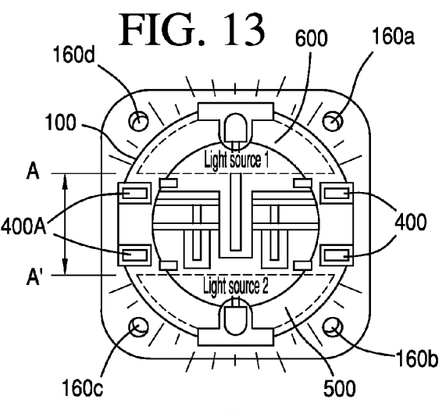
FIG. 13 is a front view of the third preferred embodiment's construction.

FIG. 13 shows the front view of the two diameter tube and its inner construction and space. The area between lines A and A' at the center of the front surface is sufficient to ensure that the prong means, copper means, conductive means (metal pieces, wires etc), resilient conductive means (spring, conductive rubbers) of the electricity delivery channel are provided with proper isolation walls and posts to prevent electric shock and hazard. The two spaces on top and lower areas with (LITE1) and (LITE2) marked are the spaces to install light means, circuit means, conductive means, resilient conductive means, wires, metal pieces to get electric power from the prong means to the light means for illumination. The assembly means (160*a*) (160*b*) (160*c*) (160*d*) include a screw in this preferred embodiment to solidly fasten the front and back case without any chance to break apart although any alternative method fastening the front and back case such as ultra-sonic sealing or a snap-tight engagement by hook and lock means may be substituted.

The current invention provides a spatial arrangement for the prong means, copper means, light means and its related circuit means inside the inner diameter housing that is totally different from that shown in prior art U.S. Pat. No. 6,862,403 with respect to construction, space arrangement, electric connection with light means and its conductive means. Also, the outer diameter housing with at least four openings on the unit eliminates other extended housing parts that would otherwise make a huge and ugly viewing appearance, instead providing a nice and compact night light unit. The receptacle will show on the unit on two selections which are top-bottom or right-left to allow the user to connect two devices on this multiple function night light at the same time. The space between the power source's surface to the receptacle(s) allows bigger prong means to connect with the night light without space concern according to yet another advantageous feature of the preferred embodiment.

Figure 14:
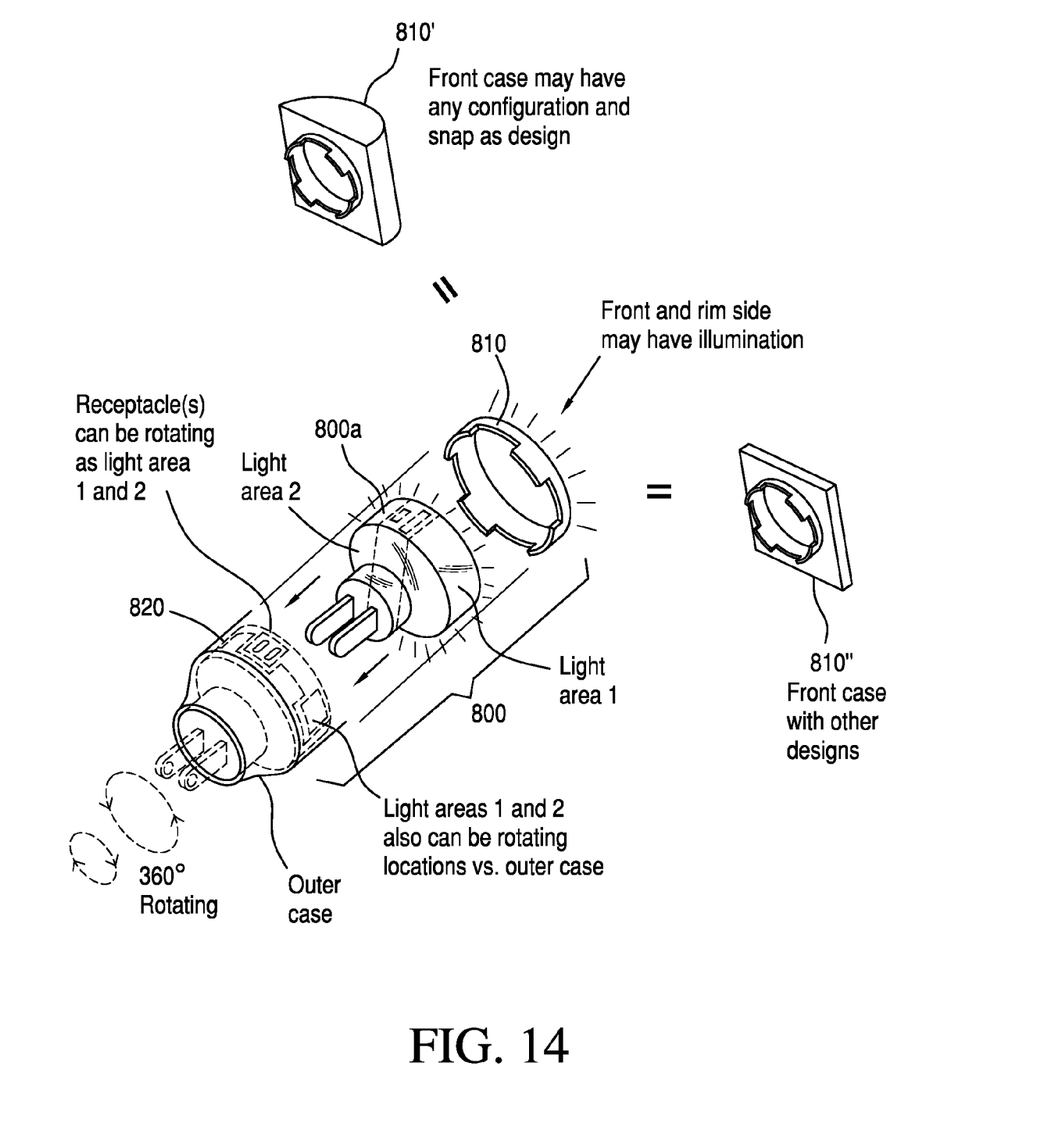
FIG. 14 is an assembly diagram of the third preferred embodiment.

FIG. 14 shows the sequential order of assembly for the front case (810) on top of the two diameter tube (800*a*). The base case (820) allows the two diameter tube (800*a*) to be freely rotated as desired and assembled together with the front case (810) by conventional assembly means which may include, for example, glue, ultra-sonic sealing, chemical solvent, hot melting, screws, riveting, snapping, catch and hook, super glue, or any other assembly method which is available on the conventional market to assemble the front case (810) and base case (820) together as required.

Figure 15:
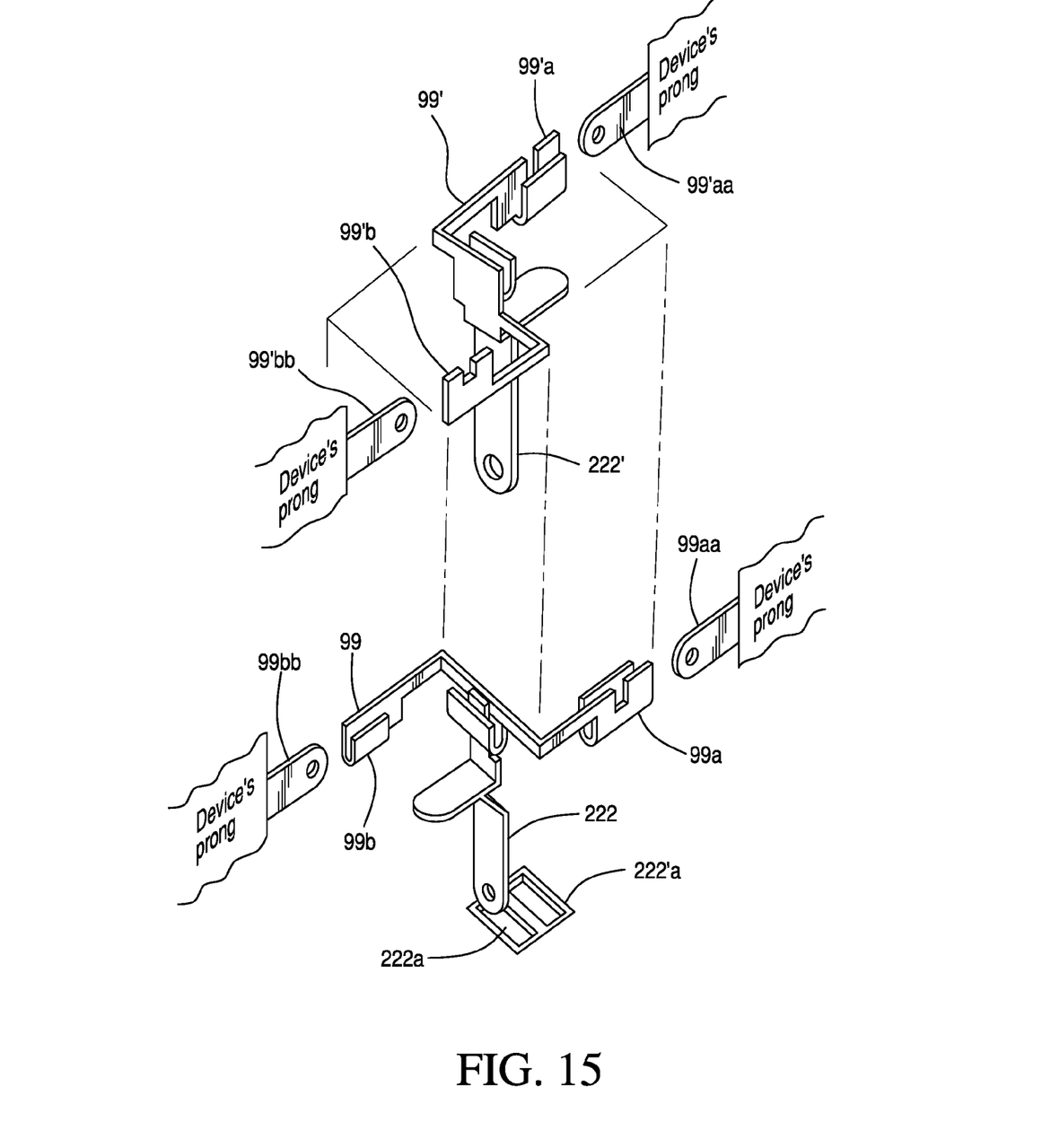
FIG. 15 shows a copper means and prong means assembly arrangement for the third preferred embodiment.

FIG. 15 shows the construction of the prong means (222) (222') to connect with its copper means (99) (99') to supply electricity from the prong means to the receptacles. The two prong means of the said night light are inserted into a wall outlet's receptacles (222*a*) (222'*a*). The receptacles of night light (99'*a*) and (99*a*) connect with other device's prong means (99'*aa*) and (99*aa*) to supply electricity to the other device. The receptacles of night light (99'*b*) and (99*b*) are connected with other device's prong means (99'*bb*) and (99*bb*) to supply electricity to the other device. The current invention uses the proper copper means (99) and (99') with high and low position and orientation and spacing arrangement to allow the electricity to be delivered from the night light prong means to its receptacles means without any electric shock and hazard by including appropriate isolation walls and posts as described above.

Having thus described preferred embodiments of the invention, it will be appreciated that any alternative or equivalent functions or structures are still intended to be within the scope of the invention, which is not limited to the details described above.

The invention claimed is:

1. A multiple function night light including:

a housing;

prong means extending from the housing for receiving electricity from a power outlet;

at least one receptacle situated in said housing and electrically connected to said prong means, said receptacle including conductors connected to said prong means, said receptacle being arranged to receive prongs of at least one other electric device to supply electricity from said power outlet through said conductors to the other electric device, said prongs of said at least one other electric device being polarized to have different sizes, and said housing being arranged with different size prong-receiving openings to prevent reverse insertions of the different size prongs into said receptacle;

at least one light means for providing illumination;

at least one conductive means for supplying said electricity from said conductors to the at least one light means, means for causing the night light prong means to swivel, rotate, or twist and thereby be inserted into a wall outlet while extending from the housing at different angles relative to the housing, to fit different wall outlets at a desired orientation;

wherein said conductive means includes at least one resilient member selected from the group consisting of a spring, a resilient metal piece, a resilient conductive wire, and a conductive rubber member, said resilient member being electrically connected between said conductors and said at least one light means, wherein said light means is installed on a surface and an electrode is formed on a back side and away from an edge of the surface, said resilient member engaging said electrode to supply electricity from said conductors to said light means, and wherein said resilient member includes a fixing means to prevent bending or variation in direction of said resilient member as it is pressed between said electrode and said conductors, said fixing means including at least one of a holder, opening, and post for fixing said resilient member at a predetermined position between said conductors and said light means.

2. A multiple function night light as claimed in claim 1, wherein the at least one light means is a light selected from the group consisting of an LED, EL, OEL, OLED, gas filled bulb, fluorescent tube, black tube, and neon tube.

3. A multiple function night light as claimed in claim 1, wherein the at least one conductive means further includes elements selected from the group consisting of at least one metal piece, conductive wire, conductive rubber, copper means, soldering material, and soldering paste.

4. A multiple function night light as claimed in claim 1, further comprising means for providing an additional function selected from the group consisting of air-fragrance, time piece, emergency light, power failure light, bluetooth device, sensor device, and infrared detector functions.

5. A multiple function night light as claimed in claim 1, wherein said conductors are connected to the night light prong means by riveting, soldering, spotting, clipping, or snapping, and the conductors are arranged to permit the night light prong means to rotate, swivel, or change position.

6. A multiple function night light as claimed in claim 1, wherein said night light prong means and said light source means are separated and on different surfaces.

7. A multiple function night light as claimed in claim 1, wherein said night light has different front cases arranged to be secured to a same basic lower case to provide a variety of designs and configurations to meet market requirements.

8. A multiple function night light as claimed in claim 1, wherein said prongs are arranged to be rotated 180° between a upwardly extending 90° angle and a downwardly extending 90° angle.

9. A multiple function night light as claimed in claim 1, wherein said prong means are arranged to rotate 360°.

* * * * *